(12) United States Patent
Cox et al.

(10) Patent No.: US 8,707,449 B2
(45) Date of Patent: Apr. 22, 2014

(54) ACQUIRING ACCESS TO A TOKEN CONTROLLED SYSTEM RESOURCE

(75) Inventors: Jason A. Cox, Raleigh, NC (US); Kevin C. Lin, Raleigh, NC (US); Eric F. Robinson, Raleigh, NC (US); Mark J. Wolski, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 12/969,634

(22) Filed: Dec. 16, 2010

(65) Prior Publication Data

US 2012/0159640 A1 Jun. 21, 2012

(51) Int. Cl.
*G06F 21/24* (2006.01)

(52) U.S. Cl.
USPC ........ 726/27; 726/9; 726/16; 726/17; 726/18; 726/19; 726/20; 726/21

(58) Field of Classification Search
USPC ............................................ 726/27, 9, 16–21
See application file for complete search history.

(56) References Cited

U.S. PATENT DOCUMENTS

| | | | |
|---|---|---|---|
| 4,707,830 A | 11/1987 | Ulug | |
| 5,634,122 A | 5/1997 | Loucks et al. | |
| 5,852,747 A | 12/1998 | Bennett et al. | |
| 6,859,927 B2 | 2/2005 | Moody et al. | |
| 6,996,647 B2 | 2/2006 | Raghavan et al. | |
| 2004/0215772 A1* | 10/2004 | Dinker et al. | 709/225 |
| 2005/0273844 A1 | 12/2005 | Dapkus et al. | |
| 2007/0300057 A1* | 12/2007 | Corcoran et al. | 713/154 |
| 2011/0138460 A1* | 6/2011 | Wheeler | 726/21 |

\* cited by examiner

*Primary Examiner* — Brandon Hoffman
*Assistant Examiner* — Samuel Ambaye
(74) *Attorney, Agent, or Firm* — Brandon C. Kennedy; H. Daniel Schnumann; Biggers Kennedy Lenart Spraggins LLP (57) ABSTRACT

Acquiring access to a token controlled system resource, including: receiving, by a token broker, a command that requires access to the token controlled system resource, where the token broker is automated computing machinery for acquiring tokens and distributing the command to the token controlled system resource for execution; identifying, by the token broker, a first need state, the first need state indicating that the token broker requires access to the token controlled system resource to which the token broker does not possess a token; requesting, by the token broker, a configurable number of tokens to gain access to the token controlled system resource, without dispatching an operation handler for executing the command until at least one token is acquired; assigning, by the token broker, an acquired token to the operation handler; and dispatching, by the token broker, the operation handler and its assigned token for executing the command.

18 Claims, 6 Drawing Sheets

ACQUIRING ACCESS TO A TOKEN CONTROLLED SYSTEM RESOURCE

BACKGROUND OF THE INVENTION

1. Field of the Invention

The field of the invention is data processing, or, more specifically, methods, apparatus, and products for acquiring access to a token controlled system resource.

2. Description Of Related Art

In modern computing system, there are a limited number of system resources available for use. Such system resources may be controlled by a token scheme in which a user cannot make use of a particular system resource without a token. Conventional token acquisition schemes are often inflexible and inefficient.

SUMMARY OF THE INVENTION

Methods, apparatus, and products for acquiring access to a token controlled system resource, including: receiving, by a token broker, a command that requires access to the token controlled system resource, where the token broker is automated computing machinery for acquiring tokens and distributing the command to the token controlled system resource for execution; identifying, by the token broker, a first need state, the first need state indicating that the token broker requires access to the token controlled system resource to which the token broker does not possess a token; requesting, by the token broker, a configurable number of tokens to gain access to the token controlled system resource, without dispatching an operation handler for executing the command until at least one token is acquired; assigning, by the token broker, an acquired token to the operation handler; and dispatching, by the token broker, the operation handler and its assigned token for executing the command.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1A:
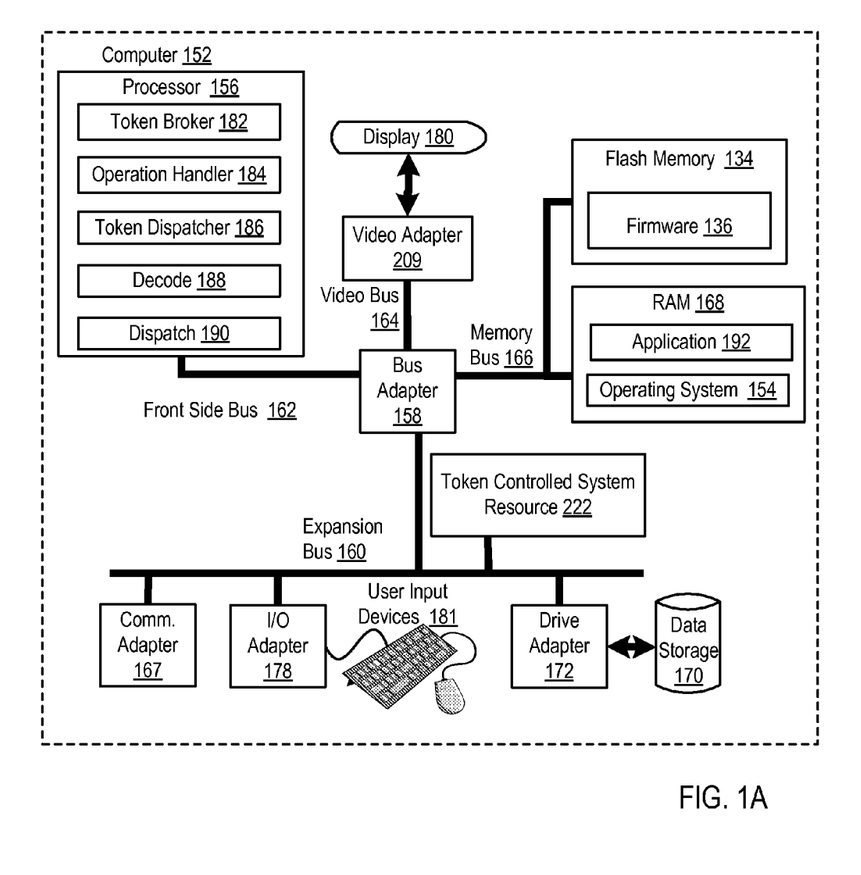
FIG. 1A sets forth a block diagram of automated computing machinery comprising an example computer useful in acquiring access to a token controlled system resource according to embodiments of the present invention.

Example methods, apparatus, and products for acquiring access to a token controlled system resource in accordance with the present invention are described with reference to the accompanying drawings, beginning with FIG. 1A. FIG. 1A sets forth a block diagram of automated computing machinery comprising an example computer (152) useful in acquiring access to a token controlled system resource according to embodiments of the present invention. The computer (152) of FIG. 1A includes at least one computer processor (156) or 'CPU' as well as random access memory (168) ('RAM') which is connected through a high speed memory bus (166) and bus adapter (158) to processor (156) and to other components of the computer (152).

The computer processor (156) of FIG. 1A includes a command decoder (188) that is a network of static and dynamic logic within the computer processor (156) that decodes commands for execution by the operation handler (184). Each command may be composed of an operation code or 'opcode' and one or more parameters that advise the computer processor (156) how to execute the opcode, where to obtain input data for execution of an opcode, where to place the results of execution of an opcode, and so on. The computer processor (156) of FIG. 1A also includes a dispatcher (190). The dispatcher (190) is a network of static and dynamic logic within the processor (156) that dispatches commands to operation handlers (184) in the processor (156).

The computer processor (156) of FIG. 1A also includes an operation handler (184), which is a module of automated computing machinery for executing commands. The computer processor (156) of FIG. 1A also includes a token dispatcher (186), which is a module of automated computing machinery for distributing tokens to token brokers (182). In the example of FIG. 1A, the operation handler (184) and the token dispatcher (186) may be embodied, for example, as computer program instructions executing on computer hardware.

The computer processor (156) of FIG. 1A also includes a token broker (182), which is a module of automated computing machinery for receiving a command that requires access to the token controlled system resource (222), identifying a first need indicating that the token broker application (182) requires access to the token controlled system resource (222) to which the token broker (182) does not possess a token, requesting a configurable number of tokens to gain access to the token controlled system resource (222) without dispatching an operation handler for executing the command until at least one token is acquired, and dispatching the operation handler and its assigned token for executing the command. In the example of FIG. 1A, the token controlled system resource (222) may be embodied as any system resource that may only be accessed and utilized when presented with a token.

Although the token broker (182), operation handler (184), token dispatcher (186), command decoder (188), and dispatcher (190) of FIG. 1A are depicted as residing within the computer processor (156), readers will appreciate that the token broker (182), operation handler (184), token dispatcher (186), command decoder (188), and dispatcher (190) may reside elsewhere. For example, the token broker (182), operation handler (184), token dispatcher (186), command decoder (188), and dispatcher (190) may reside within a cache controller for providing access to a cache that is itself a specific token controlled system resource (222).

Stored in RAM (168) is an application program (192), a module of user-level computer program instructions for carrying out particular data processing tasks such as, for example, word processing, spreadsheets, database operations, video gaming, stock market simulations, atomic quantum process simulations, or other user-level applications. Also stored in RAM (168) is an operating system (154). Operating systems useful acquiring access to a token controlled system resource according to embodiments of the present invention include UNIX™, Linux™, Windows XP™, AIX™, IBM's i5/OS™, and others as will occur to those of skill in the art. The operating system (154), token broker application (182), operation handler application (184), and token dispatcher application (186) in the example of FIG. 1A are shown in RAM (168), but many components of such software typically are stored in non-volatile memory also, such as, for example, on a disk drive (170).

The computer (152) of FIG. 1A includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for acquiring access to a token controlled system resource according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1A includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1A includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1A includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for acquiring access to a token controlled system resource according to embodiments of the present invention include modems for wired dial-up communications, Ethernet (IEEE 802.3) adapters for wired data communications network communications, and 802.11 adapters for wireless data communications network communications.

Figure 1B:
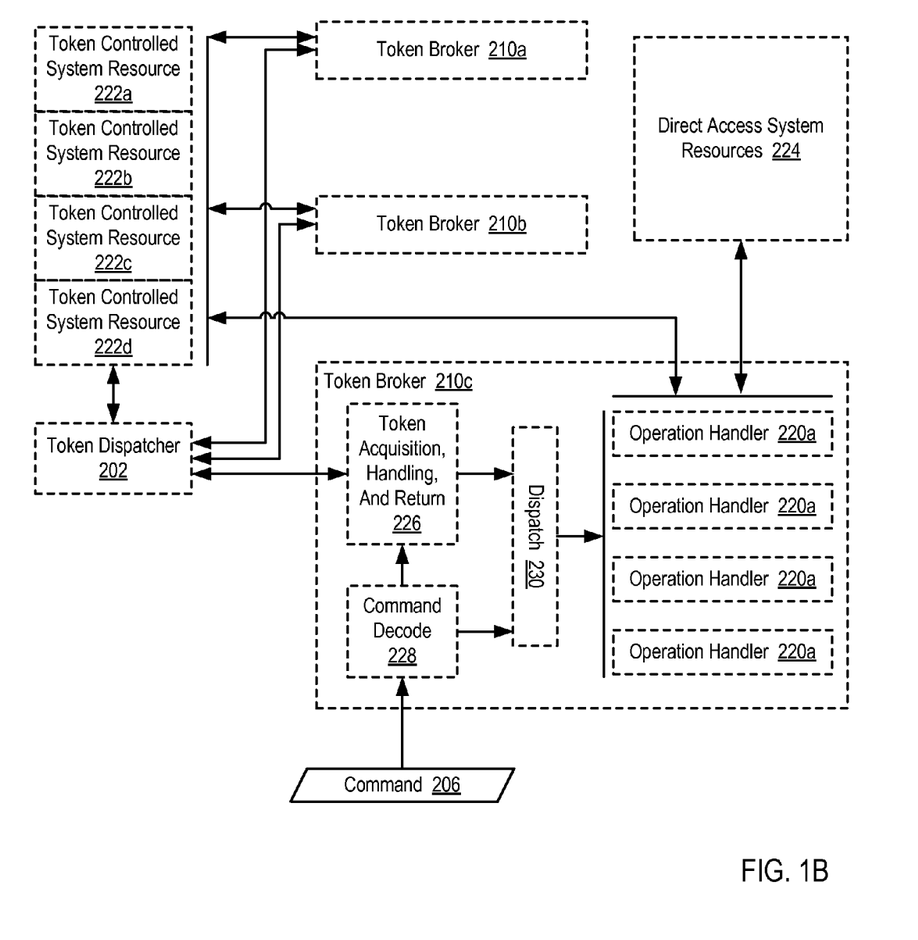
FIG. 1B sets forth a block diagram of automated computing machinery useful in acquiring access to a token controlled system resource according to embodiments of the present invention.

For further explanation, FIG. 1B sets forth a block diagram of automated computing machinery useful in acquiring access to a token controlled system resource (222a, 222b, 222c, 222d) according to embodiments of the present invention. The example of FIG. 1B includes token controlled system resources (222a, 222b, 222c, 222d) and direct access system resources (224). In the example of FIG. 1B, the token controlled system resources (222a, 222b, 222c, 222d) may be embodied as any system resource that may only be accessed and utilized when presented with a token. In the example of FIG. 1B, the direct access system resources (224) may be embodied as any system resource that may be accessed and utilized without the presentation of a token. That is, the direct access system resources (224) may be directly accessed without first acquiring a token as a condition for access. Examples of such system resources may include processing units, computer memory, computer busses, and so on.

In the example of FIG. 1B, each token controlled system resource (222a, 222b, 222c, 222d) is depicted as a single resource. Readers will appreciate, however, that each token controlled system resource (222a, 222b, 222c, 222d) may actually be a group of system resources such as, for example, a group of processing units, a group of computer memory modules, or any combination thereof. In such an example, any individual resource in a group of resources may only be accessed and utilized when presented with a token, and a particular token for accessing the group of resources may be used to gain access to any resource with the group of resources.

The example of FIG. 1B also includes token brokers (210a, 210b, 210c). In the example of FIG. 1B, each token broker (210a, 210b, 210c) is automated computing machinery for acquiring tokens and distributing commands (206) to operation handlers (220a, 220b, 220c, 220d) for execution. The token brokers (210a, 210b, 210c) of FIG. 1B may be embodied, for example, as computer software executing on computer hardware. In the example of FIG. 1B, each token broker (210a, 210b, 210c) may receive a command (206), for example, through a computer bus connected to the token brokers (210a, 210b, 210c) such as a control bus. Each command (206) may fall into one of two categories: commands that require access to a token controlled system resource (222a, 222b, 222c, 222d) and commands that do not require access to a token controlled system resource (222a, 222b, 222c, 222d).

In an example in which a command (206) is received that does not require access to a token controlled system resource (222a, 222b, 222c, 222d), the command (206) may be decoded by a command decode unit (228) and an operation handler (220a, 220b, 220c, 220d) may be dispatched by an operation handler dispatcher (230) to execute the command (206). In such an example, the command (206) may require access to a direct access system resource (224) that may be accessed by an operation handler (220a, 220b, 220c, 220d).

In an example in which a command (206) is received that requires access to a token controlled system resource (222a, 222b, 222c, 222d), the command (206) may be decoded by a command decode unit (228). However, an operation handler (220a, 220b, 220c, 220d) should not be dispatched by the operation handler dispatcher (230) to execute the command (206) unless a token is available to provide access to the token controlled system resource (222a, 222b, 222c, 222d). In such an example, the token acquisition, handling, and return unit (226) may request a token from the token dispatcher (202). If an acquired token is available for use, the operation handler (220a, 220b, 220c, 220d) may be dispatched by the operation handler dispatcher (230) to execute the command (206). In such an example, the acquired token can be assigned and passed to the operation handler (220a, 220b, 220c, 220d) for presentation to the token controlled system resource (222a, 222b, 222c, 222d).

Figure 2:
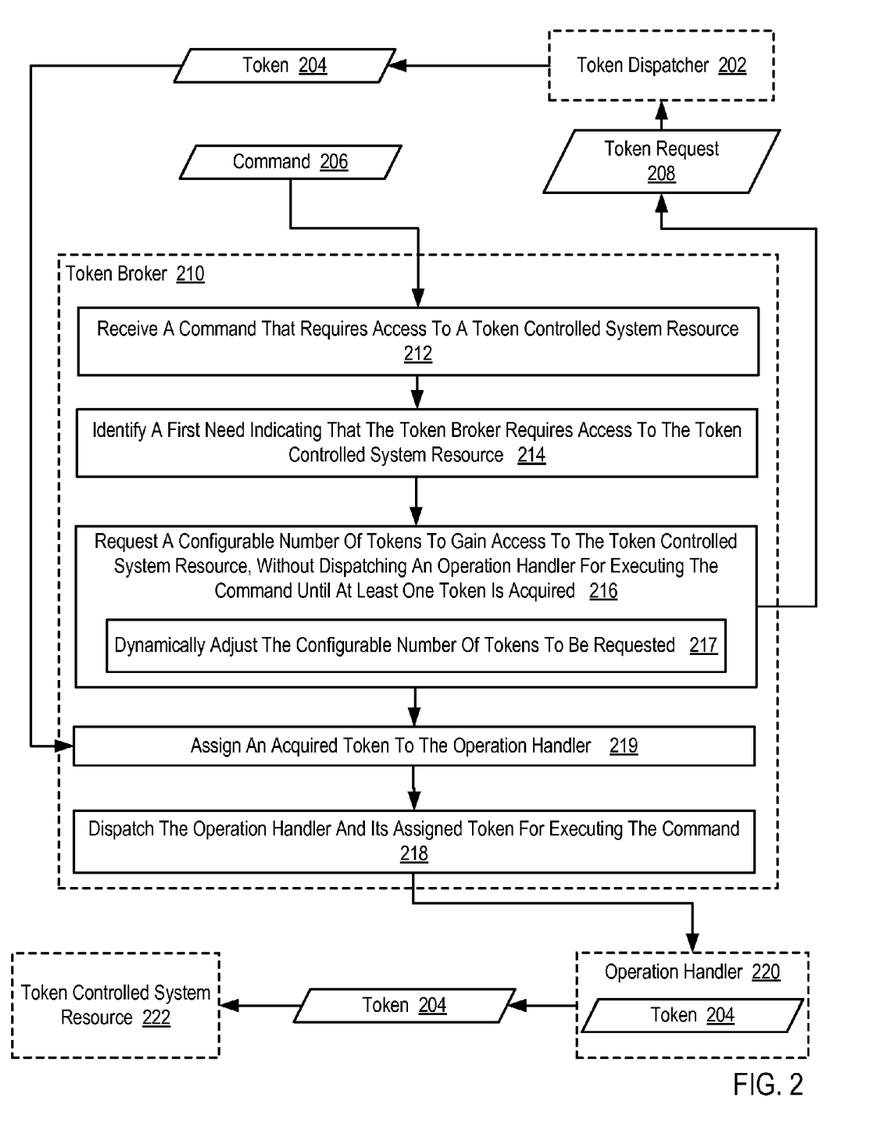
FIG. 2 sets forth a flow chart illustrating an example method for acquiring access to a token controlled system resource according to embodiments of the present invention.

For further explanation, FIG. 2 sets forth a flow chart illustrating an example method for acquiring access to a token controlled system resource (222) according to embodiments of the present invention that includes receiving (212), by a token broker (210), a command (206) that requires access to the token controlled system resource (222). In the example of FIG. 2, the token broker (210) is automated computing machinery for acquiring tokens (204) and distributing the command (206) to an operation handler (220) for execution. The token broker (210) of FIG. 2 may be embodied, for example, as computer software executing on computer hardware. The token broker (210) of FIG. 2 may receive (212) the command (206), for example, through a computer bus, such as a control bus, that is connected to the token broker (212). In the example of FIG. 2, the token broker (210) may also receive commands that do not require access to a token controlled system resource (222). Commands that do not require access to a token controlled system resource (222) may be executed by an operation handler (220) for processing without requiring an acquired token.

In the example of FIG. 2, the token controlled system resource (222) may be embodied as any system resource that may only be accessed and utilized when presented with a token (204). In the example of FIG. 2, a token (204) is a data structure for providing access to a system resource. In the example of FIG. 2, a token (204) may be passed to the token controlled system resource (222) in an attempt to gain access to the token controlled system resource (222). In such an example, the token controlled system resource (222) may inspect the contents of the token (204) and, if the contents represent a valid token, the controlled system resource (222) may be utilized by the entity that provided the token (204) to the token controlled system resource (222). Examples of a token controlled system resource (222) can include a bus, a processing unit, a cache access unit, computer memory, and so on.

The example of FIG. 2 also includes identifying (214), by the token broker (210), a first need indicating that the token broker (210) requires access to the token controlled system resource (222) to which the token broker (210) does not possess a token (204). In the example of FIG. 2, a first need indicating that the token broker (210) requires access to the token controlled system resource (222) to which the token broker (210) does not possess a token (204) occurs when a token broker (210) has received (212) a command (206) that requires access to the token controlled system resource (222) and the token broker (210) does not currently have possession of any tokens (204) for gaining access to the token controlled resource (222). In such an example, identifying (214) a first need indicating that the token broker (210) requires access to the token controlled system resource (222) to which the token broker (210) does not possess a token (204) may be carried out, for example, by determining whether the token broker (210) has possession or has attempted to obtain possession of any tokens (204) for gaining access to the token controlled resource (222) after a command (206) that requires access to the token controlled system resource (222) has been received (212).

The example of FIG. 2 also includes requesting (216), by the token broker (210), a configurable number of tokens (204) to gain access to the token controlled system resource (222). In the example of FIG. 2, the token broker (210) may request more than one token (204). That is, the token broker (210) may request a configurable number of tokens where the configurable number is equal to a predetermined maximum number of tokens (204) that the token broker (210) can possess at a single time. As such, the token broker (210) may be able to accommodate other commands (206) that require access to the token controlled system resource (222) immediately—without needing to request additional tokens (204). In this example, the token request (208) is issued to a token dispatcher (202) that is automated computing machinery for managing and distributing tokens (204) to requesters, or token brokers (210).

In the example of FIG. 2, requesting (216) a configurable number of tokens (204) to gain access to the token controlled system resource (222) can include dynamically adjusting (217) the configurable number of tokens (204) to be requested (216). The number of tokens (204) to request (216) may be dynamically adjusted (217), for example, based on token usage statistics that indicate the frequency with which a particular token broker (210) uses tokens (204) that are assigned to the token broker (210). For example, a token broker that utilizes tokens rapidly may be allowed to request more tokens than another token broker that rarely uses tokens that have been acquired. As such, the configurable number of tokens (204) that a token broker (210) can request may be regulated in dependence upon the behavior of the token broker (210).

In the example of FIG. 2, requesting (216) a configurable number of tokens (204) to gain access to the token controlled system resource (222) is done without dispatching an operation handler (220) for executing the command (206) until at least one token (204) is acquired. In the example of FIG. 2, an operation handler (220) is automated computing machinery for executing a command (206). The operation handler (220) may be embodied as computer program instructions executing on computer hardware, where the computer program instructions are configured to carry out the execution of a command (206) that is passed as input to the operation handler (220). In the example of FIG. 2, operation handlers (220) may be dispatched, or otherwise initiated, to carry out the execution of a command (206) that is passed as input to the operation handler (220). By requesting (216) a configurable number of tokens (204) to gain access to the token controlled system resource (222) without dispatching an operation handler (220) for executing the command (206) until at least one token (204) is acquired, the token broker (210) can avoid dispatching an operation handler (220) at a point in time where the command (206) cannot be executed by the operation handler (220)—when the token broker (210) has not yet acquired a token (204) necessary for executing the command (206) that requires access to the token controlled system resource (222). That is, because the command (206) requires access to the token controlled system resource (222), dispatching an operation handler (220) prior to acquiring the required token (204) will prevent the operation handler (220) from executing the command (206) that requires access to the token controlled system resource (222), thereby causing the operation handler (220) to enter into a waiting state rather than executing other commands. Commands (206) that require a token (204) to access token controlled system resources (222) for that would be dispatcher if there was an available token will be told to retry in the absence of an available token.

The example of FIG. 2 also includes assigning (219), by the token broker (210), an acquired token (204) to the operation handler (220). In the example of FIG. 2, an acquired token (204) is assigned (219) to the operation handler (220) in the sense that the token (204) is made available for use by the operation handler (220) and made unavailable for use by any other operation handlers. As such, the token (204), when assigned (219), is set aside for exclusive use by the operation handler (220).

The example of FIG. 2 also includes dispatching (218), by the token broker (210), the operation handler (220) and its assigned token (204) for executing the command (206). In the example of FIG. 2, dispatching (218) the operation handler (220) and its assigned token (204) for executing the command (206) may be carried out, for example, by instantiating an instance of an operation handler application and passing the assigned token (204) to the operation handler application as an instantiation parameter.

Figure 3:
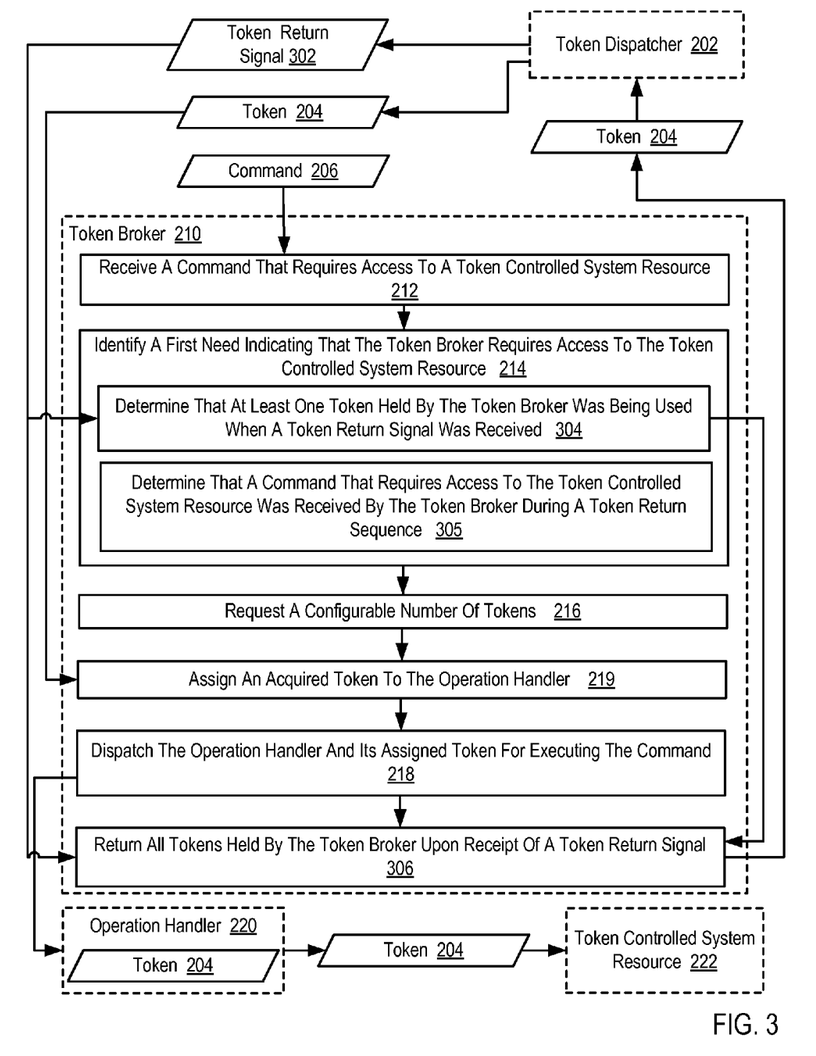
FIG. 3 sets forth a flow chart illustrating a further example method for acquiring access to a token controlled system resource according to embodiments of the present invention.

For further explanation, FIG. 3 sets forth a flow chart illustrating a further example method for acquiring access to a token controlled system resource according to embodiments of the present invention. The example of FIG. 3 is similar to the example of FIG. 2 as it also includes:

receiving (212), by a token broker (210), a command (206) that requires access to the token controlled system resource (222),
  identifying (214), by the token broker (210), a first need indicating that the token broker (210) requires access to the token controlled system resource (222) to which the token broker (210) does not possess a token (204),
  requesting (216), by the token broker (210), a configurable number of tokens (204) to gain access to the token controlled system resource (222), without dispatching an operation handler (220) for executing the command (206) until at least one token (204) is acquired,
  assigning (219), by the token broker (210), an acquired token (204) to the operation handler (220), and
  dispatching (218), by the token broker (210), the operation handler (220) and its assigned token (204) for executing the command (206).

The example of FIG. 3 also includes returning (306), by the token broker (210), all tokens (204) held by the token broker (210) upon receipt of a token return signal (302). As described above, the token broker (210) may request (216) a configurable number of tokens (204) that is greater than the amount of tokens (204) immediately needed by the token broker (210). As such, the token broker (210) may, at a given time, hold tokens (204) that are not assigned for use by a particular command (206). These tokens (204) that are not assigned for use by a particular command (206) may be returned (306) to the token dispatcher (202) upon receipt of a token return signal (302). In the example of FIG. 3, the token return signal (302) represents a special purpose command instructing the token broker (210) to return any tokens (204) that have not been assigned by the token broker (210) for use by a particular command (206) that requires access to the token controlled system resource (222). The token return signal (302) may be received by the token broker (210), for example, via a control bus that the token broker (210) is connected to. In the example of FIG. 3, the token return signal (302) is depicted as originating from the token dispatcher (202). Readers will appreciate, however, that the control bus, or any other entity connected to the control bus, may generate the token return signal (302).

In the example of FIG. 3, identifying (214) the first need indicating that the token broker (210) requires access to the token controlled system resource (222) includes determining (304) that at least one token (204) held by the token broker (210) was being used when a token return signal (302) was received. As described above, identifying (214) the first need indicating that the token broker (210) requires access to the token controlled system resource (222) may be carried out by receiving (212) the command (206) that requires access to a token controlled system resource (222). In addition, identifying (214) the first need indicating that the token broker (210) requires access to the token controlled system resource (222) may also be carried out by determining (304) that at least one token (204) held by the token broker (210) was being used when a token return signal (302) was received. In such an example, because a first need indicating that the token broker (210) requires access to the token controlled system resource (222) will be identified (214), the token broker (210), after returning all tokens, will not wait until another command (206) that requires access to the token controlled system resource (222) is received (212) before requesting (216) additional tokens (204).

In the example of FIG. 3, identifying (214) the first need indicating that the token broker (210) requires access to the token controlled system resource (222) may alternatively include determining (305) determining that a command (206) that requires access to the token controlled system resource (222) was received by the token broker (210) during a token return sequence. For example, when the token broker (210) is in the process of returning unused and unassigned tokens to the token dispatcher (202), if a command (206) that requires access to the token controlled system resource (222) is received, the token broker (210) may identify a first need indicating that the token broker (210) requires access to the token controlled system resource (222) such that the token broker (210) will begin attempting to reacquire tokens (204) upon the completion of the token return sequence.

Figure 4:
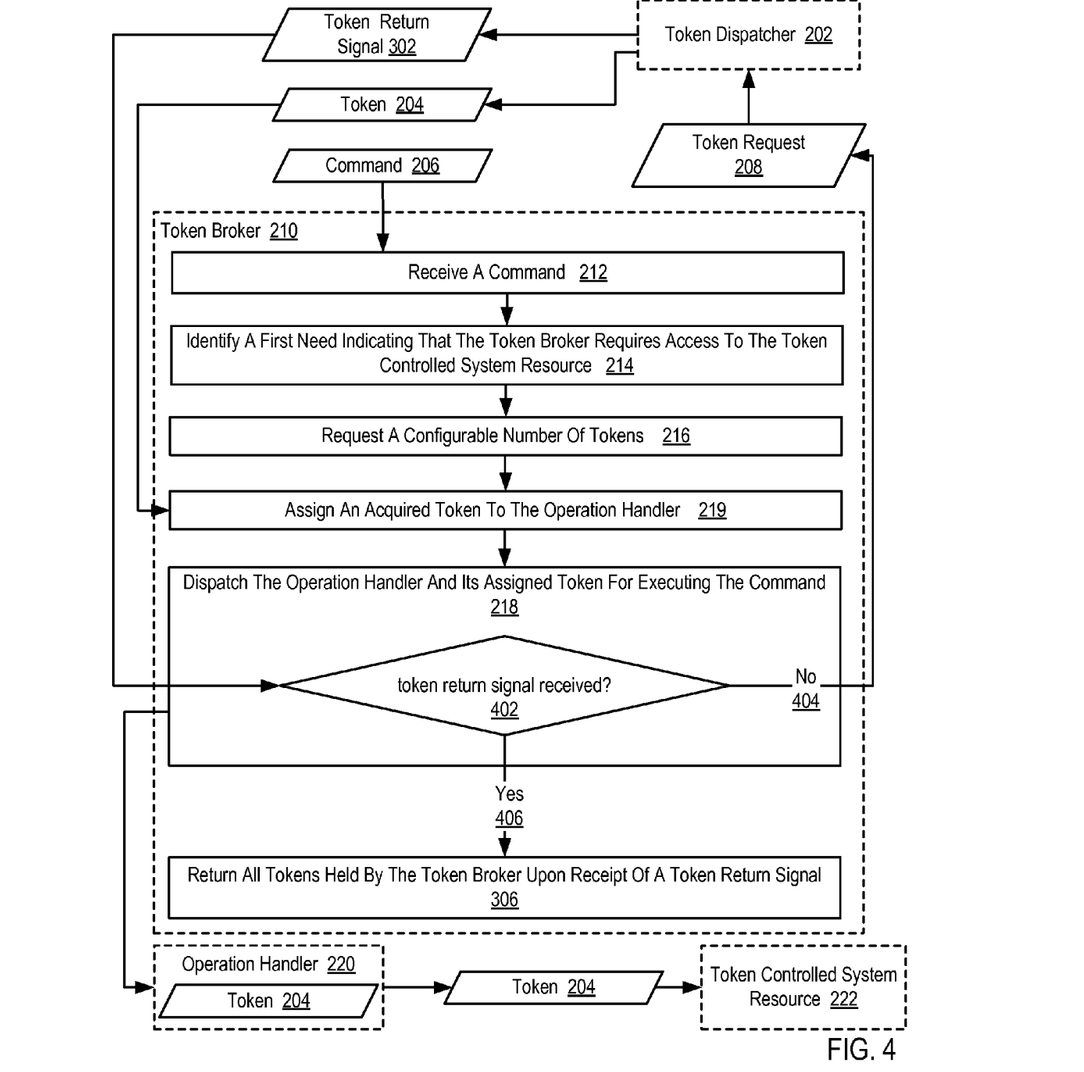
FIG. 4 sets forth a flow chart illustrating a further example method for acquiring access to a token controlled system resource according to embodiments of the present invention.

For further explanation, FIG. 4 sets forth a flow chart illustrating a further example method for acquiring access to a token controlled system resource according to embodiments of the present invention. The example of FIG. 4 is similar to the example of FIG. 2 as it also includes:

receiving (212), by a token broker (210), a command (206) that requires access to the token controlled system resource (222),
  identifying (214), by the token broker (210), a first need indicating that the token broker (210) requires access to the token controlled system resource (222) to which the token broker (210) does not possess a token (204),
  requesting (216), by the token broker (210), a configurable number of tokens (204) to gain access to the token controlled system resource (222), without dispatching an operation handler (220) for executing the command (206) until at least one token (204) is acquired,
  assigning (219), by the token broker (210), an acquired token (204) to the operation handler (220), and
  dispatching (218), by the token broker (210), the operation handler (220) and its assigned token (204) for executing the command (206).

In the example of FIG. 4, however, dispatching (218) the operation handler (220) and its assigned token (204) for executing the command (206) also includes determining (402) whether a token return signal (302) has been received and when a token return signal has not (404) been received, requesting at least one additional token (204), for example, by issuing a token request. In the example of FIG. 4, determining (402) whether a token return signal (302) has been received may be carried out, for example, by checking a control bus connected to the token broker (210), by checking a command queue that stores commands received by the token broker (210), and so on. In the example of FIG. 4, if a token return signal (302) has (406) been received, the token broker (210) returns (306) all tokens (204) held by the token broker (210). In the example of FIG. 4, if a token return signal (302) has not (404) been received, the token broker (210) requests at least one additional token (204), for example, by issuing a token request (208). In such an example the token broker (210) can continue to acquire new tokens (204) each time an assigned token (204) and an operation handler (220) are dispatched (218) so that the token broker (210) can service additional commands (206) that require access to a token controlled resource (222). If a token return signal (302) has been received, a token broker may alternatively prevent dispatching the operation handler with an assigned token (218) in order to expedite returning all tokens held by the token broker (306).

Figure 5:
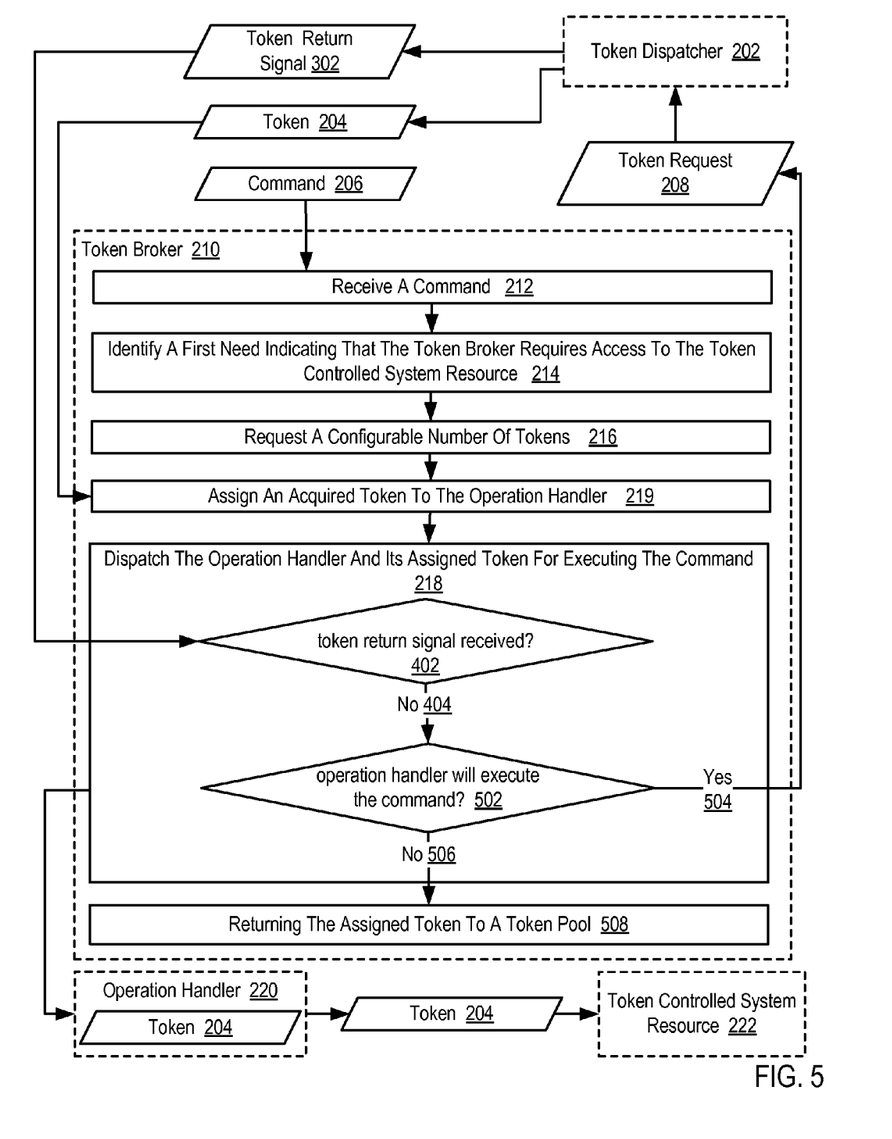
FIG. 5 sets forth a flow chart illustrating a further example method for acquiring access to a token controlled system resource according to embodiments of the present invention.

For further explanation, FIG. 5 sets forth a flow chart illustrating a further example method for acquiring access to a token controlled system resource according to embodiments of the present invention. The example of FIG. 5 is similar to the example of FIG. 2 as it also includes:

- receiving (212), by a token broker (210), a command (206) that requires access to the token controlled system resource (222),
- identifying (214), by the token broker (210), a first need indicating that the token broker (210) requires access to the token controlled system resource (222) to which the token broker (210) does not possess a token (204),
- requesting (216), by the token broker (210), a configurable number of tokens (204) to gain access to the token controlled system resource (222), without dispatching an operation handler (220) for executing the command (206) until at least one token (204) is acquired,
- assigning (219), by the token broker (210), an acquired token (204) to the operation handler (220), and
- dispatching (218), by the token broker (210), the operation handler (220) and its assigned token (204) for executing the command (206).

In the example of FIG. 5, however, dispatching (218) the operation handler (220) and its assigned token (204) for executing the command (206) also includes determining (402) whether a token return signal (302) has been received and also determining (502) whether the operation handler (220) will execute the command (206). In the example of FIG. 5, determining (402) whether a token return signal (302) has been received may be carried out, for example, by checking a control bus connected to the token broker (210), by checking a command queue that stores commands received by the token broker (210), and so on. In the example of FIG. 5, if a token return signal (302) has been received, the token broker (210) returns all tokens (204) held by the token broker (210).

In the example of FIG. 5, dispatching (218) the operation handler (220) and its assigned token (204) for executing the command (206) also includes determining (502) whether the operation handler (220) will execute the command (206). In the example of FIG. 5, determining (502) whether an operation handler will execute the command (206) that requires access to the token controlled system resource (222) may be carried out, for example, by checking a control bus connected to the token broker (210) that indicates whether the bus manager has determined that the command can be executed (504) or that the command can not be executed (506).

In the example of FIG. 5, when a token return signal (302) has not (404) been received and the operation handler (220) will (504) execute the command (206), the token broker (210) can request at least one additional token (204) via a token request (208) so that the token broker (210) can accommodate additional commands that require access to the token controlled system resource (222). In the example of FIG. 5, however, when a token return signal (302) has not (404) been received and the operation handler (220) will not (506) execute the command (206), the token broker (210) may return (508) the assigned token (204) to a token pool (not shown), thereby making the assigned token (204) available for use in executing additional commands that require access to the token controlled system resource (222).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of acquiring access to a token controlled system resource, the method comprising:
   receiving, by a token broker, a command that requires access to the token controlled system resource, wherein the token broker is automated computing machinery for acquiring tokens and distributing the command to the token controlled system resource for execution;
   identifying, by the token broker, a first need state by determining that the token broker does not have possession of at least one token that provides access to the token controlled system resource;
   in response to determining that the token broker does not have possession of at least one token that provides access to the token controlled system resource, requesting, by the token broker, a configurable number of tokens that provide to gain access to the token controlled system resource, without dispatching an operation handler for executing the command until at least one token is acquired;
   in response to requesting the configurable number of tokens, acquiring at least one token;
   assigning, by the token broker, the at least one acquired token to the operation handler;
   in response to assigning the at least one acquired token to the operation handler, dispatching, by the token broker, the operation handler and the at least one assigned token for executing the command; and
   returning, by the token broker, to the token dispatcher, all tokens held by the token broker upon receipt of a token return signal such that the returned tokens are available for use in executing additional commands that require access to the token controlled system resource.

2. The method of claim 1 wherein identifying the first need indicating that the token broker requires access to the token controlled system resource includes determining that at least one token held by the token broker was being used when the token return signal was received.

3. The method of claim 1 wherein identifying the first need indicating that the token broker requires access to the token controlled system resource includes determining that a command that requires access to the token controlled system resource was received by the token broker during a token return sequence.

4. The method of claim 1 wherein dispatching, by the token broker, the operation handler and its assigned token for executing the command includes:
   determining whether the token return signal has been received; and
   when the token return signal has not been received, requesting at least one additional token.

5. The method of claim 1 wherein dispatching, by the token broker, the operation handler and its assigned token for executing the command includes:
   determining whether the token return signal has been received;
   determining whether the operation handler will execute the command;
   when the token return signal has not been received and the operation handler will execute the command, requesting at least one additional token; and
   when the token return signal has not been received and the operation handler will not execute the command, returning the assigned token to a token pool.

6. The method of claim 1 further comprising dynamically adjusting the configurable number of tokens to be requested.

7. Apparatus for acquiring access to a token controlled system resource, the apparatus comprising a computer processor, a computer memory operatively coupled to the computer processor, the computer memory having disposed within it computer program instructions that, when executed by the computer processor, cause the apparatus to carry out the steps of:
   receiving, by a token broker, a command that requires access to the token controlled system resource, wherein the token broker is automated computing machinery for acquiring tokens and distributing the command to the token controlled system resource for execution;

identifying, by the token broker, a first need state by determining that the token broker does not have possession of at least one token that provides access to the token controlled system resource;

in response to determining that the token broker does not have possession of at least one token that provides access to the token controlled system resource, requesting, by the token broker, a configurable number of tokens that provide to gain access to the token controlled system resource, without dispatching an operation handler for executing the command until at least one token is acquired;

in response to requesting the configurable number of tokens, acquiring at least one token;

assigning, by the token broker, the at least one acquired token to the operation handler;

in response to assigning the at least one acquired token to the operation handler, dispatching, by the token broker, the operation handler and the at least one assigned token for executing the command; and returning, by the token broker, to the token dispatcher, all tokens held by the token broker upon receipt of a token return signal such that the returned tokens are available for use in executing additional commands that require access to the token controlled system resource.

8. The apparatus of claim 7 wherein identifying the first need indicating that the token broker requires access to the token controlled system resource includes determining that at least one token held by the token broker was being used when the token return signal was received.

9. The apparatus of claim 7 wherein identifying the first need indicating that the token broker requires access to the token controlled system resource includes determining that a command that requires access to the token controlled system resource was received by the token broker during a token return sequence.

10. The apparatus of claim 7 wherein dispatching, by the token broker, the operation handler and its assigned token for executing the command includes:
  determining whether the token return signal has been received; and
  when the token return signal has not been received, requesting at least one additional token.

11. The apparatus of claim 7 wherein dispatching, by the token broker, the operation handler and its assigned token for executing the command includes:
  determining whether the token return signal has been received;
  determining whether the operation handler will execute the command;
  when the token return signal has not been received and the operation handler will execute the command, requesting at least one additional token; and
  when the token return signal has not been received and the operation handler will not execute the command, returning the assigned token to a token pool.

12. The apparatus of claim 7 further comprising computer program instructions that, when executed by the computer processor, cause the apparatus to carry out the step of dynamically adjusting the configurable number of tokens to be requested.

13. A computer program product for acquiring access to a token controlled system resource, the computer program product disposed upon a non-transitory computer readable storage medium, the computer program product comprising computer program instructions that, when executed, cause a computer to carry out the steps of:
  receiving, by a token broker, a command that requires access to the token controlled system resource, wherein the token broker is automated computing machinery for acquiring tokens and distributing the command to the token controlled system resource for execution;
  identifying, by the token broker, a first need state by determining that the token broker does not have possession of at least one token that provides access to the token controlled system resource;
  in response to determining that the token broker does not have possession of at least one token that provides access to the token controlled system resource, requesting, by the token broker, a configurable number of tokens that provide to gain access to the token controlled system resource, without dispatching an operation handler for executing the command until at least one token is acquired;
  in response to requesting the configurable number of tokens, acquiring at least one token;
  assigning, by the token broker, the at least one acquired token to the operation handler;
  in response to assigning the at least one acquired token to the operation handler, dispatching, by the token broker, the operation handler and the at least one assigned token for executing the command; and
  returning, by the token broker, to the token dispatcher, all tokens held by the token broker upon receipt of a token return signal such that the returned tokens are available for use in executing additional commands that require access to the token controlled system resource.

14. The computer program product of claim 13 wherein identifying the first need indicating that the token broker requires access to the token controlled system resource includes determining that at least one token held by the token broker was being used when the token return signal was received.

15. The computer program product of claim 13 wherein identifying the first need indicating that the token broker requires access to the token controlled system resource includes determining that a command that requires access to the token controlled system resource was received by the token broker during a token return sequence.

16. The computer program product of claim 13 wherein dispatching, by the token broker, the operation handler and its assigned token for executing the command includes:
  determining whether the token return signal has been received; and
  when the token return signal has not been received, requesting at least one additional token.

17. The computer program product of claim 13 wherein dispatching, by the token broker, the operation handler and its assigned token for executing the command includes:
  determining whether the token return signal has been received;
  determining whether the operation handler will execute the command;
  when the token return signal has not been received and the operation handler will execute the command, requesting at least one additional token; and
  when the token return signal has not been received and the operation handler will not execute the command, returning the assigned token to a token pool.

18. The computer program product of claim 13 further comprising computer program instructions that, when executed, cause a computer to carry out the step of dynamically adjusting the configurable number of tokens to be requested.

* * * * *